United States Patent [19]

Yasue et al.

[11] Patent Number: 4,671,906

[45] Date of Patent: Jun. 9, 1987

[54] METHOD AND APPARATUS FOR PRODUCTION OF MINUTE METAL POWDER

[75] Inventors: Kazuo Yasue, Ichinomiya; Toshiyuki Nishio, Nagoya; Mineo Kosaka, Tsushima, all of Japan

[73] Assignees: Agency of Industrial Science & Technology; Ministry of International Trade & Industry, both of Tokyo, Japan

[21] Appl. No.: 843,232

[22] Filed: Mar. 24, 1986

[30] Foreign Application Priority Data

Mar. 26, 1985 [JP] Japan .................................. 60-62678

[51] Int. Cl.$^4$ ................................................ B22F 9/06
[52] U.S. Cl. .......................................... 264/9; 425/6;
 75/0.5 B; 75/0.5 C
[58] Field of Search ............... 266/207, 209; 75/0.5 B,
 75/0.5 R, 0.5 C; 164/71.1, 129, 501, 511; 264/5,
 9; 425/6

[56] References Cited

U.S. PATENT DOCUMENTS

| | | | |
|---|---|---|---|
| 2,997,245 | 8/1961 | Nilsson et al. | 241/1 |
| 3,599,319 | 8/1971 | Weinstein et al. | 29/527.6 |
| 4,321,086 | 3/1982 | Perepezko et al. | 75/0.5 C |
| 4,441,542 | 4/1984 | Pryor et al. | 164/485 |
| 4,522,577 | 6/1985 | Ruthardt | 425/6 |

*Primary Examiner*—John F. Terapane
*Assistant Examiner*—Eric Jorgensen
*Attorney, Agent, or Firm*—Oblon, Fisher, Spivak, McClelland & Maier

[57] ABSTRACT

A minute metal powder is obtained by a method which comprises melting a metal, imparting ultrasonic vibration to the resulting melt, introducing an inert or reducing gas into the ultrasonically vibrated melt thereby producing minute bubbles therein, allowing cavitation to occur as soon as the bubbles reach the surface of the melt and consequently convert the melt into minute droplets, exposing or not exposing the minute droplets to oxygen, nitrogen, or propane, and solidifying the minute droplets by cooling. An apparatus for working the method described above comprises a metal melting tank, metal feeding means, gas feeding means, an ultrasonic vibration generator, means for detecting and retaining the surface of melt, and means for converting melt into minute droplets and solidifying the minute droplets by cooling.

10 Claims, 1 Drawing Figure

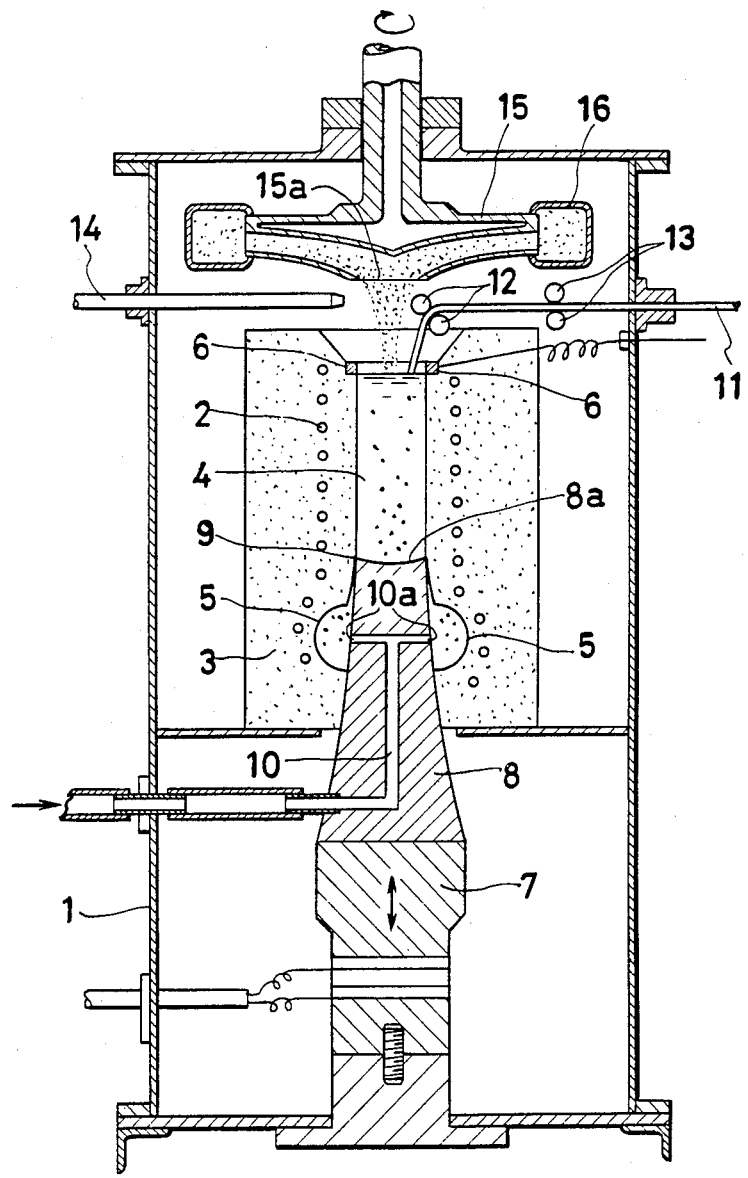

METHOD AND APPARATUS FOR PRODUCTION OF MINUTE METAL POWDER

FIELD OF THE INVENTION AND RELATED ART STATEMENT

This invention relates to a method for the production of minute and uniform particles of a metal (inclusive of alloy or carbide, oxide, or nitride) and to an apparatus for working the method.

As means of producing minute metal particles, the atomization method, the centrifugation method, the rotary atomizer method, the reduction method, and the liquid-phase or gaseous-phase reaction method have been known to the art. Each of these methods possesses characteristics of its own. Heretofore, it has been customary to select a suitable method from among these methods in due consideration of the nature of a given raw material or the characteristic properties to be expected of the produced powder. Among other methods cited above, the atomization method is suitable even for the production of minute particles of an alloy or an active metal and has been finding rapidly growing utility in recent years.

The conventional methods for the production of minute metal particles mentioned above, however, have various drawbacks. In the case of the atomization method, for example, the produced powder has a broad range of particle diameter distribution, the yield in the production of particles not exceeding 100 μm in diameter is extremely low and, depending on the kind of raw material used, possibly falls below several %, and the uniformity of particle shape is inferior in most cases.

Although the centrifugation method or the rotary atomization method is capable of producing relatively spherical particles, it has a disadvantage that the range of particle size distribution is liable to widen. It has another disadvantage that while the produced particles acquire relatively small diameters when the amount of the melt projected on the rotating plate is small, they become coarse when the amount of the melt so projected is increased for the purpose of increasing the output.

The reduction method and the liquid-phase or gaseous-phase reaction method, i.e. the so-called chemical methods, are capable of producing minute powder having a narrow range of particle size distribution. They nevertheless suffer from a disadvantage that they are applicable only to an alloy of a specific composition or to a specific pure metal.

In the circumstances, the need for a method which is applicable to all metals and alloys, produces minute powder having a narrow range of particle size distribution, gives the product in a high yield, and permits easy production of a minute metal powder of a desired particle size and for an apparatus for working the method is felt strongly.

OBJECT AND SUMMARY OF THE INVENTION

An object of this invention is to provide a method and an apparatus which satisfy the need mentioned above.

To accomplish the object, this invention provides a method for the production of minute metal powder, which comprises melting a metal, imparting ultrasonic vibration to the resulting melt, introducing a gas incapable of reacting with the melt into the ultrasonically vibrated melt thereby allowing the gas to be divided into uniform minute bubbles, allowing cavitation to occur as soon as the minute bubbles move up and reach the surface of the melt to convert the melt into minute droplets, and solidifying the metal minute droplets by cooling. Minute metal compound powder can be produced by exposing the minute metal droplets produced by this invention to a reactive gas before the droplets are solidified by cooling.

The object of this invention is further accomplished by an apparatus used for working the method described above, which apparatus comprises a metal melting tank, means disposed contiguously to the metal melting tank and used for forwarding the melt, means for blowing a gas into the melt held in the metal melting tank, an ultrasonic vibration generator disposed so as to impart ultrasonic vibration to the melt in the metal melting tank, means for detecting the position of the surface of the melt held inside the metal melting tank, means for keeping the surface of the melt in the metal melting tank within a fixed range based on the results of the detection made by the detection means mentioned above, and means for cooling and solidifying minute droplets of metal issuing from the surface of the melt in the metal melting tank. Optionally, the apparatus of this invention further comprises means for issuing a reactive gas for contact with the minute metal droplets departing from the surface of the melt.

BRIEF DESCRIPTION OF THE DRAWING

THE drawing illustrates a typical apparatus for the production of minute metal powder as an embodiment of this invention.

DETAILED DESCRIPTION OF PREFERRED EMBODIMENTS

In this invention, minute metal powder is produced by introducing into a molten metal an inert or reducing gas incapable of reacting with the melt, causing the introduced gas to be uniformly dispersed in the form of minute bubbles by means of ultrasonic vibration, and allowing cavitation to occur as soon as the minute bubbles reach the surface of the melt thereby converting the melt into minute droplets.

The phenomenon of atomization resorting to cavitation has found utility as in a humidifier using water. The mechanism of this phenomenon remains yet to be elucidated. It is presumed that the air dissolved in water, for example, grows into bubbles on the negative pressure side of the sonic wave and the bubbles rise to and float on the surface of water, and they give rise to mist when they are burst by the cavitation of sonic pulses.

The idea of producing minute metal powder by utilizing the phenomenon of cavitation as contemplated by this invention has never been conceived before. In this case, growth of bubbles and bursting of such bubbles by cavitation do not occur easily because the molten metal has fairly high density, viscosity, and surface tension as compared with water and the amount of dissolved gas in the melt is conspicuously small.

This invention, therefore, attains continuous atomization of a molten metal by using a powerful ultrasonic wave source and, at the same time, forcing the introduction of an inert gas or a reducing gas, the primary cause for cavitation, into the melt thereby inducing uniform dispersion of the gas into minute bubbles and facilitating the occurrence of cavitation.

As the gas so introduced into the melt, argon or hydrogen is used.

Where the product is desired to be minute metal compound powder instead of minute metal powder, it can be obtained simply by exposing the minute metal droplets issuing from the surface of the melt to a reactive gas such as, for example, oxygen, nitrogen, or propane.

Finally, the minute metal powder aimed at is obtained by solidifying the minute metal droplets by cooling.

The diameter of the minute metal particles can be varied as required by controlling the pressure with which the gas is introduced into the melt and the output of the ultrasonic wave source. For example, the diameter can be decreased by shortening the wavelength of the ultrasonic wave to be generated.

The raw material for the minute metal powder may be an elementary metal or an alloy. It has been demonstrated that particularly desirable results are obtained with aluminum, Al-Zn, Zn, Ti alloys, etc.

Now, the apparatus of the present invention will be described below with reference to the accompanying drawing which illustrates a typical example of the apparatus. A chamber 1 encloses principal components of the apparatus and keeps them under a controlled atmosphere.

Inside the chamber 1, a crucible 3 or a metal melting tank incorporating therein a heater 2 is set in place. In the crucible 3 is disposed a channel part 4 possessing an open lower end. A space 5 is formed on the inner wall of the crucible 3 in the lower portion of the channel part 4. Electrode chips 6 formed of electroconductive ceramics are buried as means for detecting the surface of the melt at a suitable position of the inner wall of the crucible 3 in the upper portion of the channel part 4.

An ultrasonic vibration device 7 is disposed under the crucible 3. This ultrasonic vibration device is attached to the crucible in such a manner as to impart ultrasonic vibration to the melt held inside the crucible. The ultrasonic vibration device 7 is provided at the upper end thereof with a horn 8 possessing a concave surface 8a capable of focusing the ultrasonic output on the surface of the melt. The horn 8 is inserted through the lower end of the channel part 4 until the concave surface 8a is positioned at the bottom of the channel part 4. In the clearance intervening between the crucible 3 and the horn 8 and extending from the space 5 to the channel part 4, there is formed a gap 9 capable of exclusively passing a gas.

In the horn 8 there is formed a gas passage 10. The gas passage 10 has the terminal part thereof formed in the shape of the letter T to give rise to gas inlets 10a opening into the space 5.

The gas passage 10, the gas inlets 10a, and the space 5 jointly form means for feeding a gas into the melt.

Above the crucible inside the chamber 1 are disposed a pair of feed rollers 12 and a pair of guide rollers 13 jointly constituting means for feeding out a wire of material 11 to be melted. The spout of a nozzle 14 opens into the upper portion of the channel part 4.

The metal to be melted is desired to be supplied in the form of a wire as illustrated in the drawing.

Further above the channel part 4 is disposed an impeller 15 possessing a suction inlet 15a.

In the apparatus constructed as described above, the wire material 11 made of a metal is paid out through the feed rollers 12 and the guide rollers 13 into the channel part 4, melted with a heater 2 inside the channel part 4, and stored in a molten state in the channel part 4.

The inert gas or reducing gas such as argon or hydrogen is passed through the gas passage 10 and supplied via the gas inlets 10a into the space 5.

The horn 8 is kept vibrated vertically by the ultrasonic vibration device 7. The gas supplied to the space 5, while being forwarded through the gap 9 to the bottom of the channel part 4, is severed by the aforementioned vertical vibration between the crucible 3 and the horn 8 and dispersed in the form of minute bubbles into the channel part 4.

In the channel part 4, the vertical vibration of the horn 8 forms a linear convection of the melt. By this linear convection, the minute bubbles are further stirred and uniformly dispersed in the melt. Thus, by the interaction of vibration between the crucible 3 and the horn 8, the gas is uniformly dispersed in the form of minute bubbles in the melt.

The bubbles float up the melt. On reaching the surface of the melt, they are burst by the cavitation of the ultrasonic output of the horn 8 to induce conversion of the melt into minute droplets.

The droplets generated by the method described above are caught by a means adapted to solidify the droplets by cooling. To be more specific, the droplets are sucked into the impeller 15 attached to the upper portion of the crucible 3 and rotated at a high speed. Since the impeller 15 is kept cooled with cold water, the droplets sucked into the impeller are solidified. Minute chemically stable powder produced as the result is accumulated in casings 16 formed one each at the opposite ends of the impeller 15.

A nozzle 14 is provided as a device for issuing a reactive gas for contact with the minute droplets.

When a reactive gas such as oxygen, nitrogen, or propane is blown into a column of droplets rising from the surface of the melt, the droplets which are in a chemically active stage readily react with the blown gas to give birth to a minute oxide, nitride, or carbide powder. To ensure generation of droplets in a fixed state from the surface of the melt, it is necessary that the apparatus should be provided with means for keeping the surface of the melt at a fixed level and that the horn 8 should be constructed in such a manner as to focus the ultrasonic output on the surface of the melt.

To ensure maintenance of the surface of the melt at a fixed level, in the apparatus illustrated in the drawing, the electrode chips 6 are buried at a suitable position under the inner wall of the channel part 4 and these electrode chips 6 are adapted to form a switch circuit connected to the power source for the feed rollers 12.

When the wire material 11 is fed through the feed rollers 12 and the guide rollers 13 to the channel part 4 and the surface of the melt inside the channel part 4 rises and contacts the electrode chips 6, an electric current flows through the switch circuit formed of the electrode chips 6 and turns off the switch of the power source for the feed rollers 12.

When the conversion of the melt into minute droplets has proceeded to such an extent that the surface of the melt drops and ceases its contact with the electrode chips 6, the flow of the electric current through the switch circuit formed of the electrode chips 6 no longer continues and the switch of the power source for the feed rollers 12 is turned on. As a result, the wire material 11 is paid out through the feed rollers 12 and the guide rollers 13 into the channel part 4 to raise the surface of the melt. As a result, the surface of the melt inside the channel part 4 is always kept at the fixed level.

Further in the apparatus illustrated in the drawing, the horn 8 is provided at the upper end thereof with the concave surface 8a so formed as to focus the ultrasonic output on the surface of the melt which is kept at the fixed level as described above. In this apparatus, therefore, the droplets produced by the cavitation can be issued in a fixed condition from the surface of the melt.

None of the conventional methods for the production of various powders have been able to control particle sizes of their products. It has been confirmed that by the present invention, the particle size of its product can be controlled by the frequency of the ultrasonic wave. The particle size of the produced minute powder decreases in proportion as the frequency increases. Further, the minute powder of this invention has a narrow range of particle size distribution as compared with the products by the conventional methods. The yield of minute particles having desired sphericity is extremely high in the product of this invention. Besides, the amount of such a gas as argon to be consumed is small as compared with that of the atomization method. The production entails no noise.

In accordance with this invention, very minute spherical particles having a narrow range of particle size distribution can be efficiently produced with a relatively simple apparatus by the use of small energy.

This invention is applicable to the production of any minute metal powder without reference to the chemical composition of the metal used. The product, therefore, can be in the form of an oxide, a carbide, or a nitride. Since almost no impurities find their way into the powder during the course of its production, this invention can supply minute metal powder of high quality at a low price.

Now, the production of minute metal powder by the method of this invention using the apparatus of this invention will be described below with reference to working examples.

EXAMPLE 1

An apparatus of this invention constructed as shown in the drawing and having the following dimensional particulars was used.
Crucible—80 mm in outside diameter and 15 mm in height
Horn—15 mm in inside diameter and 150 mm in height A wire of an aluminum 50%-zinc 50% alloy 3 mm in diameter was supplied at a rate of 10 cm/minute into a horn and converted into a melt at 600° C. The melt was exposed to an ultrasonic wave at 20 KHz and argon gas was blown into the melt at a rate of 50 cc/minute for conversion of the melt into minute droplets. When the powder produced as the result was analyzed for particle size, it was found that the particle sizes were distributed in the range of 30 to 80 μm, with a peak of the distribution at 50 μm, and that the particle sizes of 80% of the particles fell in the range of 50±10 μm. When the conversion of the melt into minute droplets was effected at a frequency of 100 KHz, it was found that the particle sizes were distributed between 10 and 50 μm and that particle sizes of not less than 80% of the particles fell in the range of 20±10 μm. All the particles produced were invariably in a spherical shape.

EXAMPLE 2

In the same apparatus as used in Example 1, a wire of 99.99% aluminum 3 mm in diameter was supplied at a rate of 10 cm/minute into the horn and converted into a molten metal at 750° C. The melt was converted into minute droplets at a frequency of 20 KHz. Argon was blown into the melt at a rate of 50 cc/minute. As a reactive gas, oxygen was supplied at a rate of 100 cc/minute and allowed to react with the aluminum droplets. The powder obtained by cooling the droplets was found by analysis to be composed of $Al_2O_3$ and aluminum. The $Al_2O_3$ content of the powder was about 75%. The particle sizes of the powder were distributed in the range of 40 to 90 μm.

What is claimed is:

1. A method for the production of minute metal powder, which comprises imparting ultrasonic vibration to a molten metal, introducing into the ultrasonically vibrated melt a gas thereby causing said gas to be uniformly dispersed in said melt in the form of minute bubbles, allowing cavitation to occur as soon as said minute bubbles rise up said melt and reach the surface of said melt, thereby inducing conversion of said melt into minute droplets, and solidifying said minute droplets by cooling.

2. A method according to claim 1, wherein said melt is allowed to react with a reactive gas thereby producing minute droplets of a metal compound, and subsequently solidifying said minute metal compound droplets by cooling.

3. The melthod of claim 2, wherein said gas is selected from the group consisting of oxygen, nitrogen and propane.

4. A method according to claim 1, wherein said metal is one member selected from the group consisting of elementary metals and alloys thereof.

5. The method of claim 1, wherein said gas is incapable of reacting with said melt.

6. The method of claim 5, wherein said gas is argon or hydrogen.

7. An apparatus for the production of minute metal powder, which comprises a metal melting tank, means disposed contiguously to said metal melting tank and adapted to forward a metal to be melted to said metal melting tank, means for forwarding a gas into the molten metal in said metal melting tank, an ultrasonic vibration generating device adapted to impart ultrasonic vibration to the melt in said metal melting tank, and means for detecting a position of the surface of said melt in said melt in a prescribed range in said metal melting tank based on the results of the detection obtained by said detection means, and means for solidifying minute droplets of said melt issuing from the surface of said melt in said metal melting tank by cooling.

8. An apparatus according to claim 7, which further comprises means for issuing a gas for contact with said minute droplets of melt.

9. The apparatus of claim 8, wherein said gas is capable of reacting with said melt.

10. An apparatus according to claim 7, wherein said device for detecting the position of the surface of said melt in said metal melting tank is a means composed of electrode chips disposed inside said metal melting tank and connected electrically to drive switch of said means for forwarding a metal to be melted to said metal melting tank.

* * * * *